(12) United States Patent
Chayat

(10) Patent No.: US 8,805,373 B2
(45) Date of Patent: Aug. 12, 2014

(54) FRACTIONAL FREQUENCY REUSE DEPLOYMENT METHOD FOR WIRELESS SYSTEM

(75) Inventor: Naftali Chayat, Kfar Saba (IL)

(73) Assignee: Sparkmotion Inc., Ottawa, Ontario (CA)

( * ) Notice: Subject to any disclaimer, the term of this patent is extended or adjusted under 35 U.S.C. 154(b) by 854 days.

(21) Appl. No.: 12/942,162

(22) Filed: Nov. 9, 2010

(65) Prior Publication Data

US 2011/0111783 A1 May 12, 2011

(30) Foreign Application Priority Data

Nov. 9, 2009 (IL) .......................................... 202000

(51) Int. Cl.
*H04W 36/00* (2009.01)
*H04W 4/00* (2009.01)
*H04B 7/208* (2006.01)

(52) U.S. Cl.
USPC ............ 455/436; 370/331; 370/344; 455/447

(58) Field of Classification Search
USPC ......... 370/229, 329, 343, 480, 330, 312, 208, 370/447, 436; 455/63.1, 452.1, 452.2, 509, 455/522, 436, 447
See application file for complete search history.

(56) References Cited

U.S. PATENT DOCUMENTS

| | | | | |
|---|---|---|---|---|
| 7,929,484 | B2 * | 4/2011 | Henderson et al. | ............ 370/328 |
| 2006/0014542 | A1 * | 1/2006 | Khandekar et al. | ............ 455/447 |
| 2007/0177501 | A1 * | 8/2007 | Papasakellariou | ............ 370/229 |
| 2010/0075687 | A1 | 3/2010 | Chayat | |
| 2010/0110996 | A1 * | 5/2010 | Tao et al. | ....................... 370/329 |
| 2010/0120415 | A1 * | 5/2010 | Urquhart et al. | ............... 455/424 |
| 2010/0144356 | A1 * | 6/2010 | Li et al. | ........................... 455/446 |
| 2011/0205929 | A1 * | 8/2011 | Quek et al. | ..................... 370/252 |

OTHER PUBLICATIONS

Halpern. "Reuse Partitioning in Cellular Systems." 33rd IEEE Vehicular Technology Conference, pp. 322-327, May 25-27, 1983.
Katzela et al. "Channel Assignment Schemes for Cellular Mobile Telecommunication Systems: A Comprehensive Survey." IEEE Personal Communications. 3(3):10-31 (Jun. 1996).

* cited by examiner

*Primary Examiner* — Nizar Sivji
(74) *Attorney, Agent, or Firm* — Procopio, Cory, Hargreaves & Savitch LLP

(57) ABSTRACT

A wireless communications system is described, which comprises a plurality of base stations and a plurality of subscriber devices. Each of the base stations comprises at least one antenna for communicating with respective subscriber devices currently located within a geographical area of a wireless cell served by a respective base station, and wherein: the geographical area of the wireless cell comprises a geographical central area and a geographical edge area; more than a third of all transmission resources available to the serving base station are available for communicating with the subscriber devices located within the geographical edge area of the wireless cell; and at least one of the transmission resources available for communicating with each of the subscriber devices currently located within the geographical edge area of the wireless cell is other than any of the transmission resources available for communicating with subscriber devices currently located within geographical edge areas of wireless cells each having a geographical edge area that is geographically adjacent to the geographical edge area of the wireless cell at which the subscriber device is located.

16 Claims, 16 Drawing Sheets

Fractional-Frequency Reuse based resource allocation in a 3-sector base station with tree resources, two being used in each sector Fractional Frequency Reuse
6 out of 9 resources in each sector
Based on {12}-{23}-{31}-{12}-{23}-{31} coloring in three directions
Applied to 3-sector clover-leaf deployment

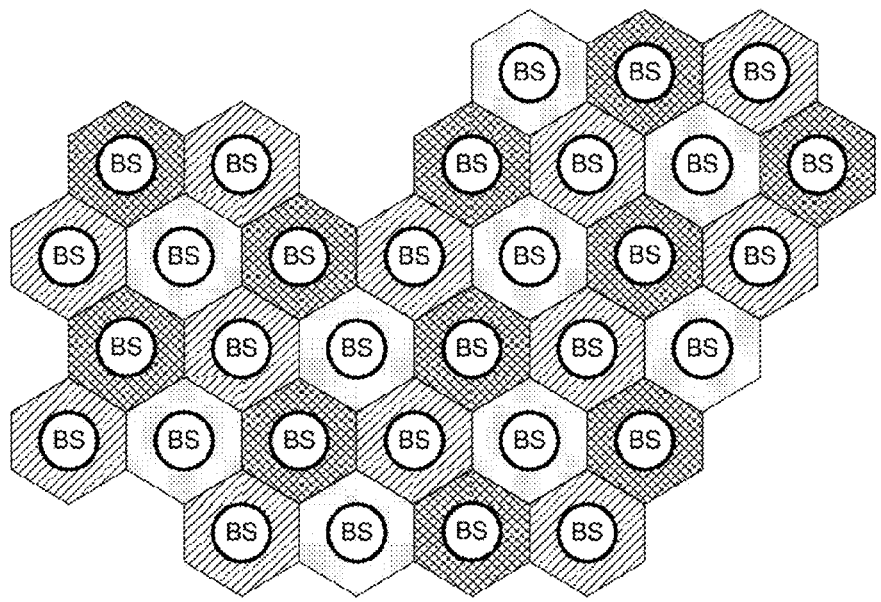
*Figure 1A - Omnidirectional cells with reuse 3 - Prior Art*
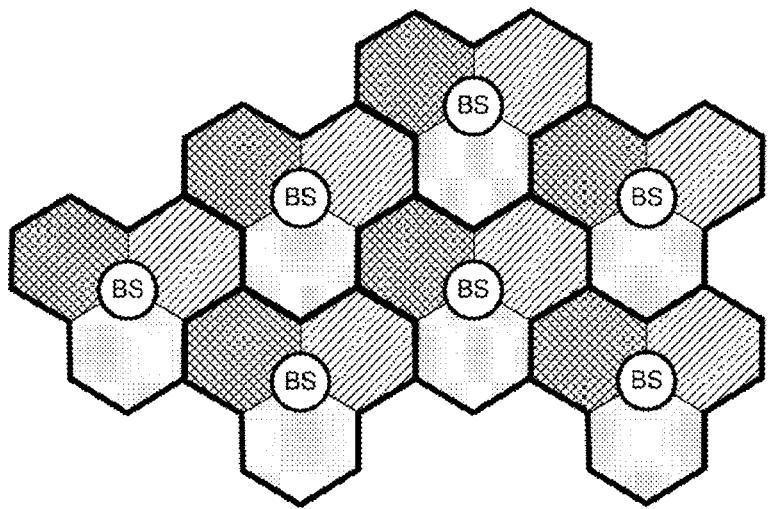
*Figure 1B - 3-sector clover-leaf cells with reuse 3 - Prior Art*

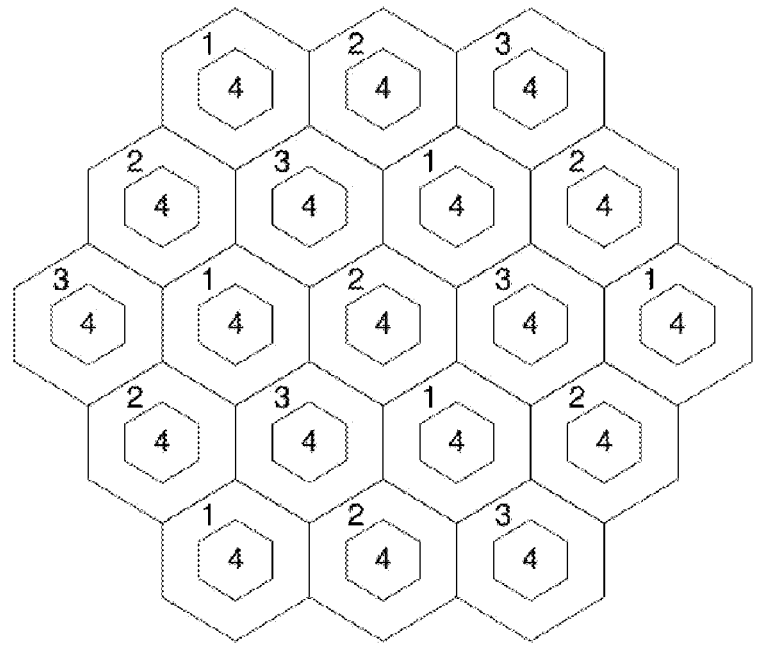
Figure 2A - Reuse Partitioning
Reuse 3 at edge cell and Reuse 1 at the center
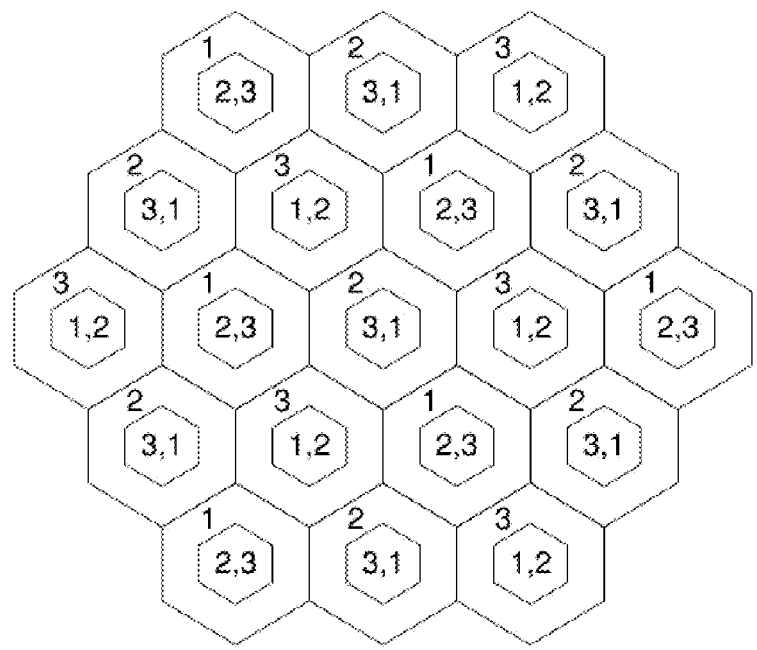
Figure 2B - Power-based Fractional Frequency Reuse
Reuse 3 at cell edge + low-power use of other resources at the center

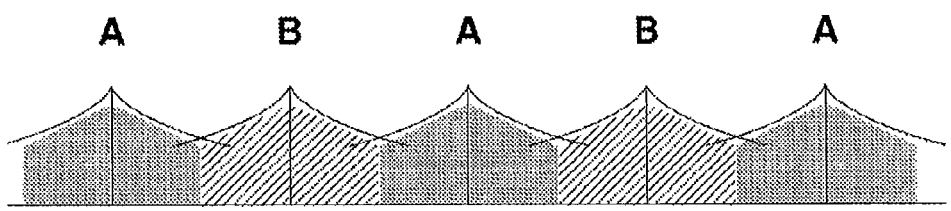
Figure 3A - Regular one-dimensional resource allocation with two resources -Prior Art
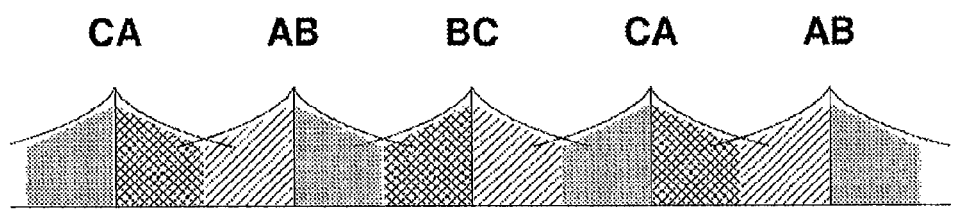
Figure 3B - Fractional-Frequency Reuse based one-dimensional resource allocation with three resources, two being used in each base station

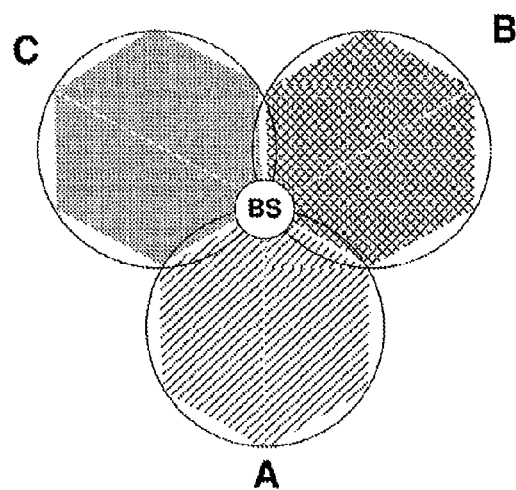
Figure 4A - Regular allocation of three resources in a 3-sector base station -Prior Art
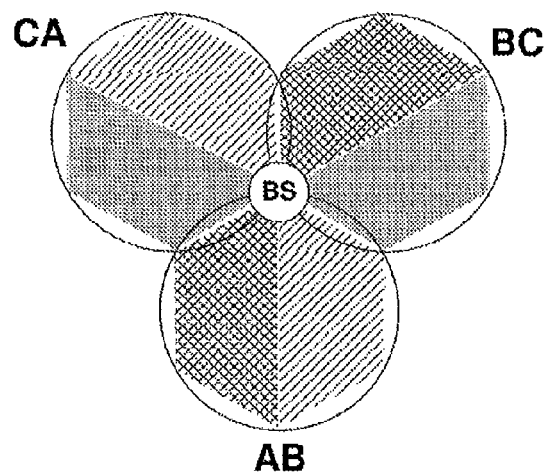
Figure 4B - Fractional-Frequency Reuse based resource allocation in a 3-sector base station with tree resources, two being used in each sector

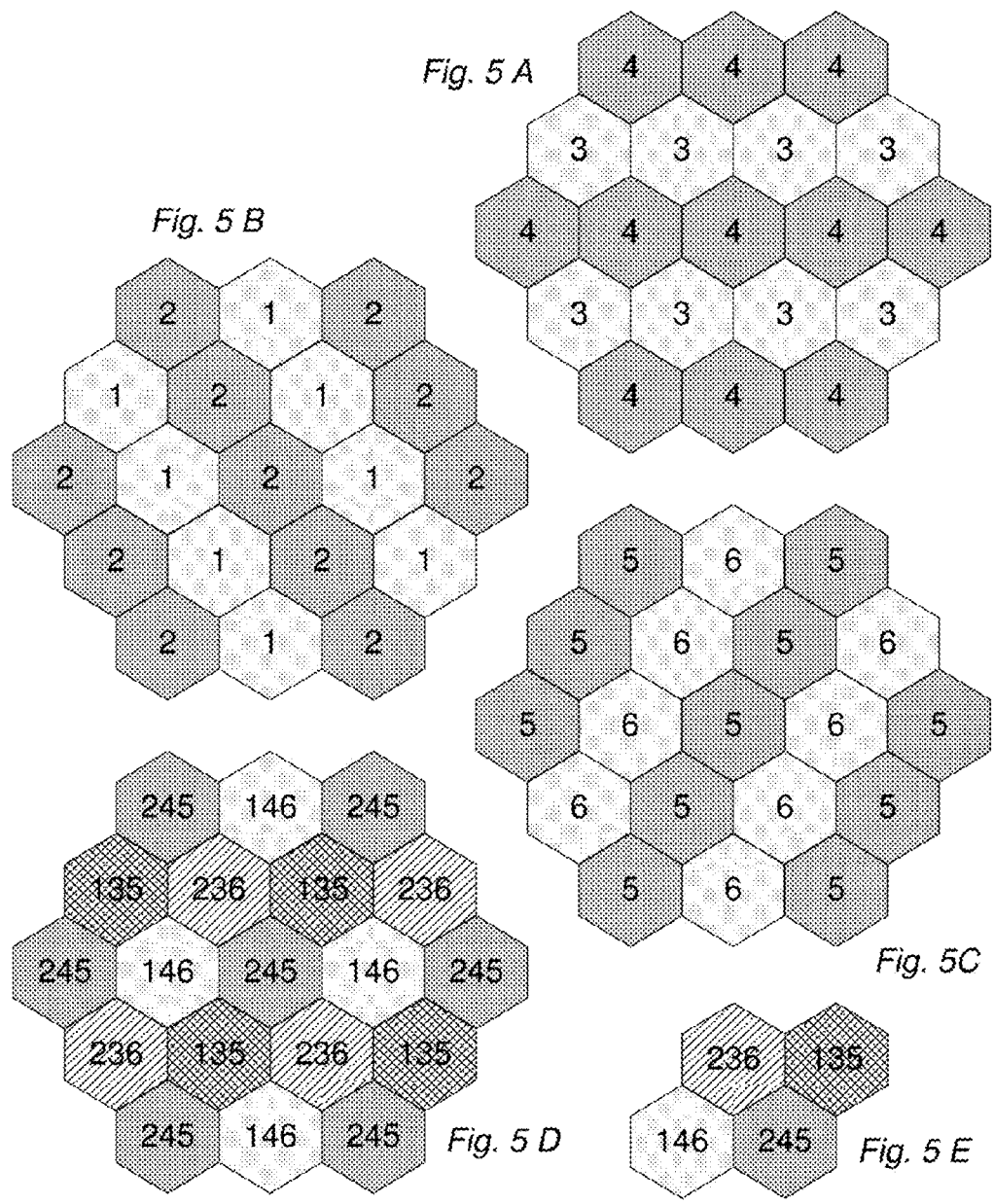
Figure 5 - Fractional Frequency Reuse
3 out of 6 resources in each cell construction
Based on a-b-a-b-a-b coloring in three directions
results in 2*2 reuse block

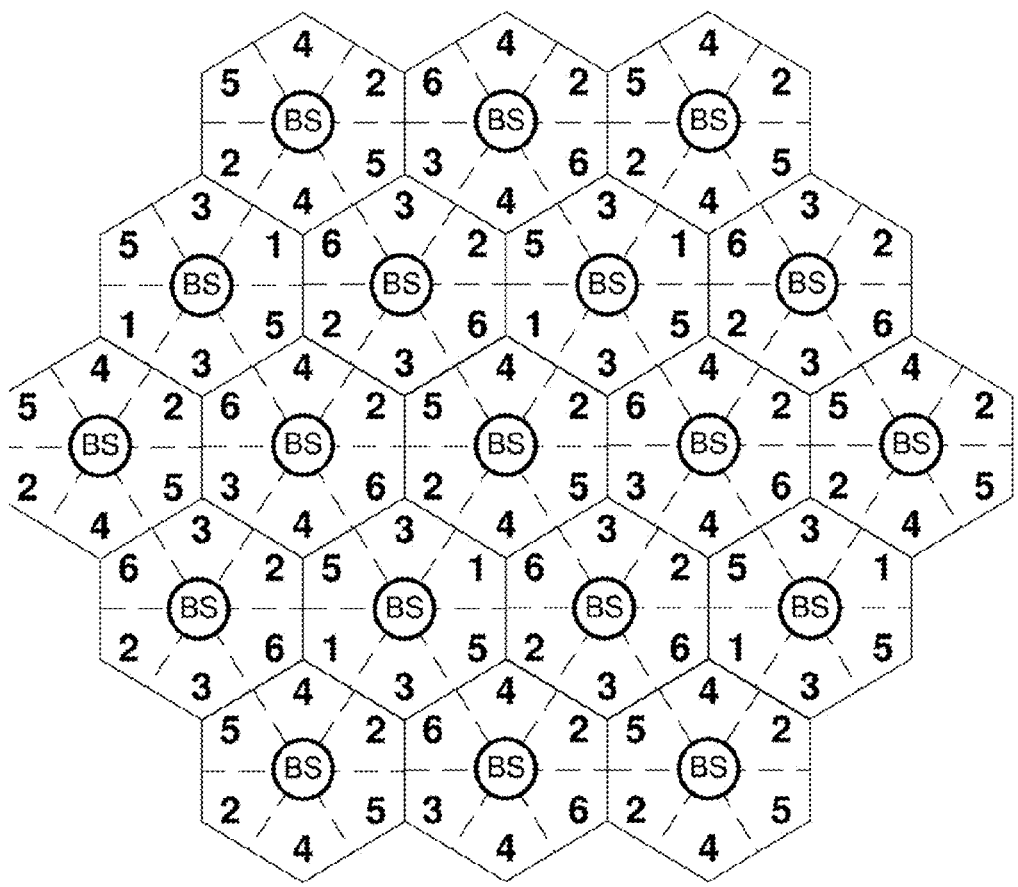
*Figure 6 - FFR with 3 out of 6 resources in each cell- prefered resource depending on location within the cell*

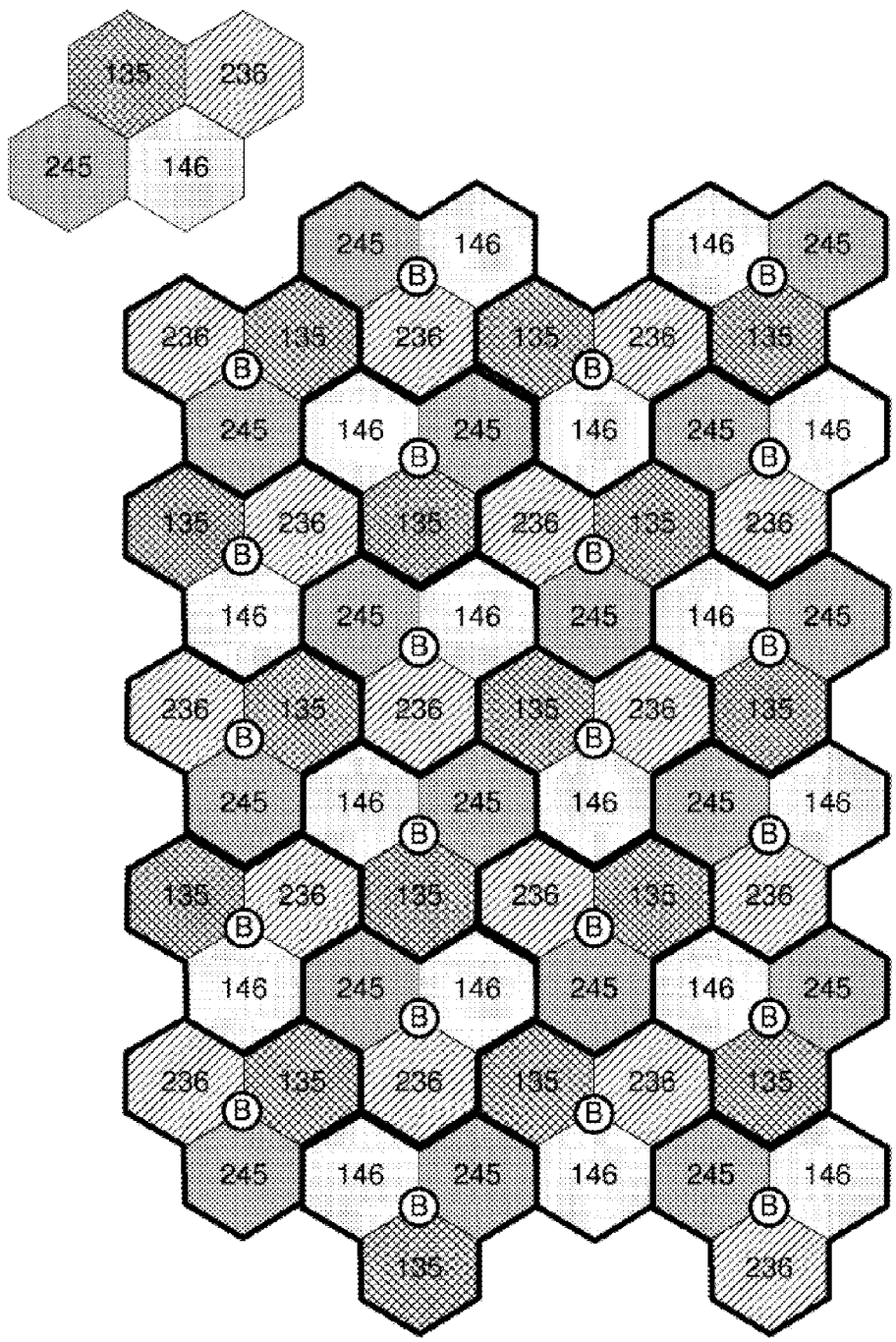
*Figure 7 - Fractional Frequency Reuse
3 out of 6 resources in each sector
Based on 1-2-1-2-1-2 coloring in three directions
Applied to 3-sector clover-leaf deployment*

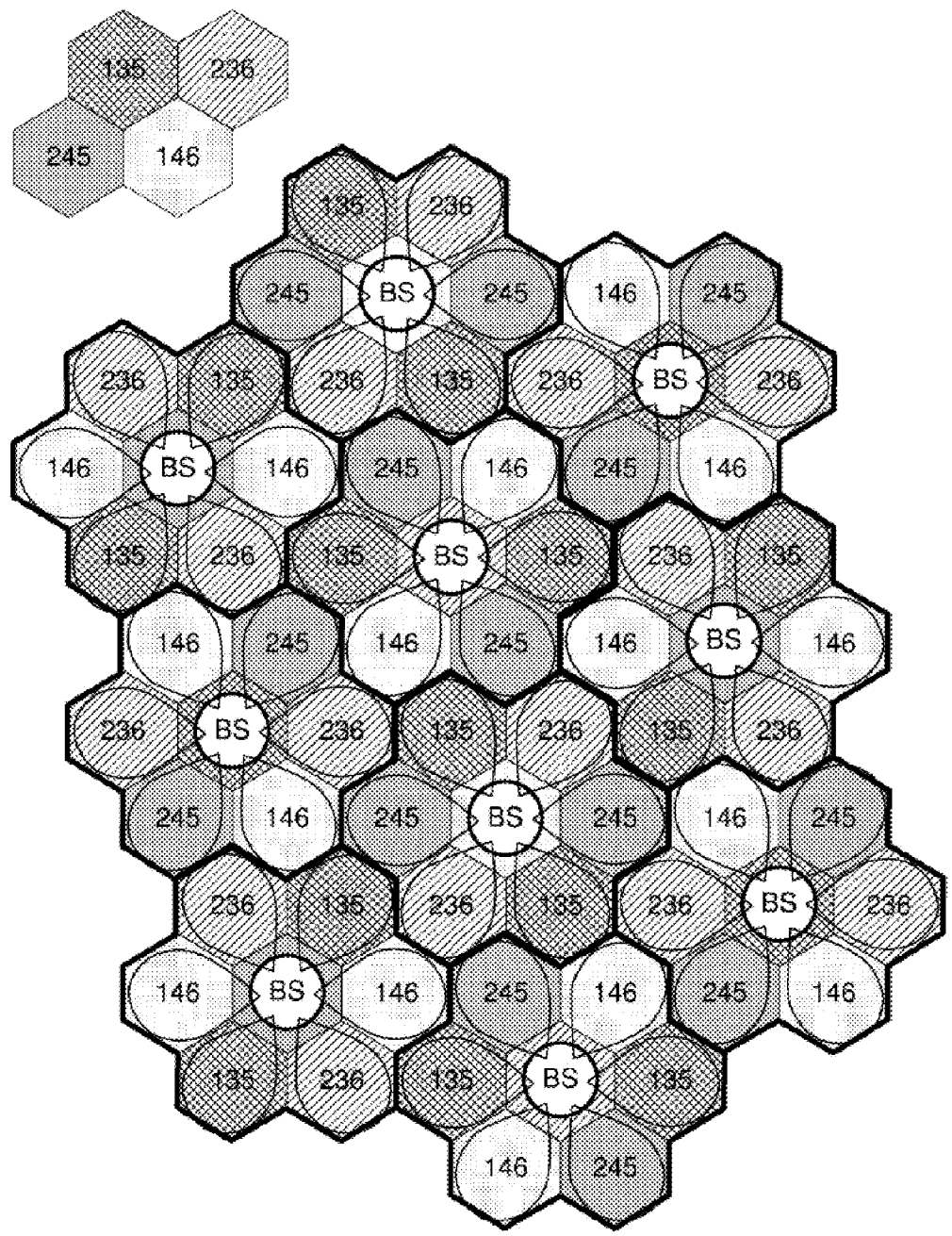
*Figure 8 - Fractional Frequency Reuse
3 out of 6 resources in each sector
Based on 1-2-1-2-1-2 coloring in three directions
Applied to 6-sector deployment*

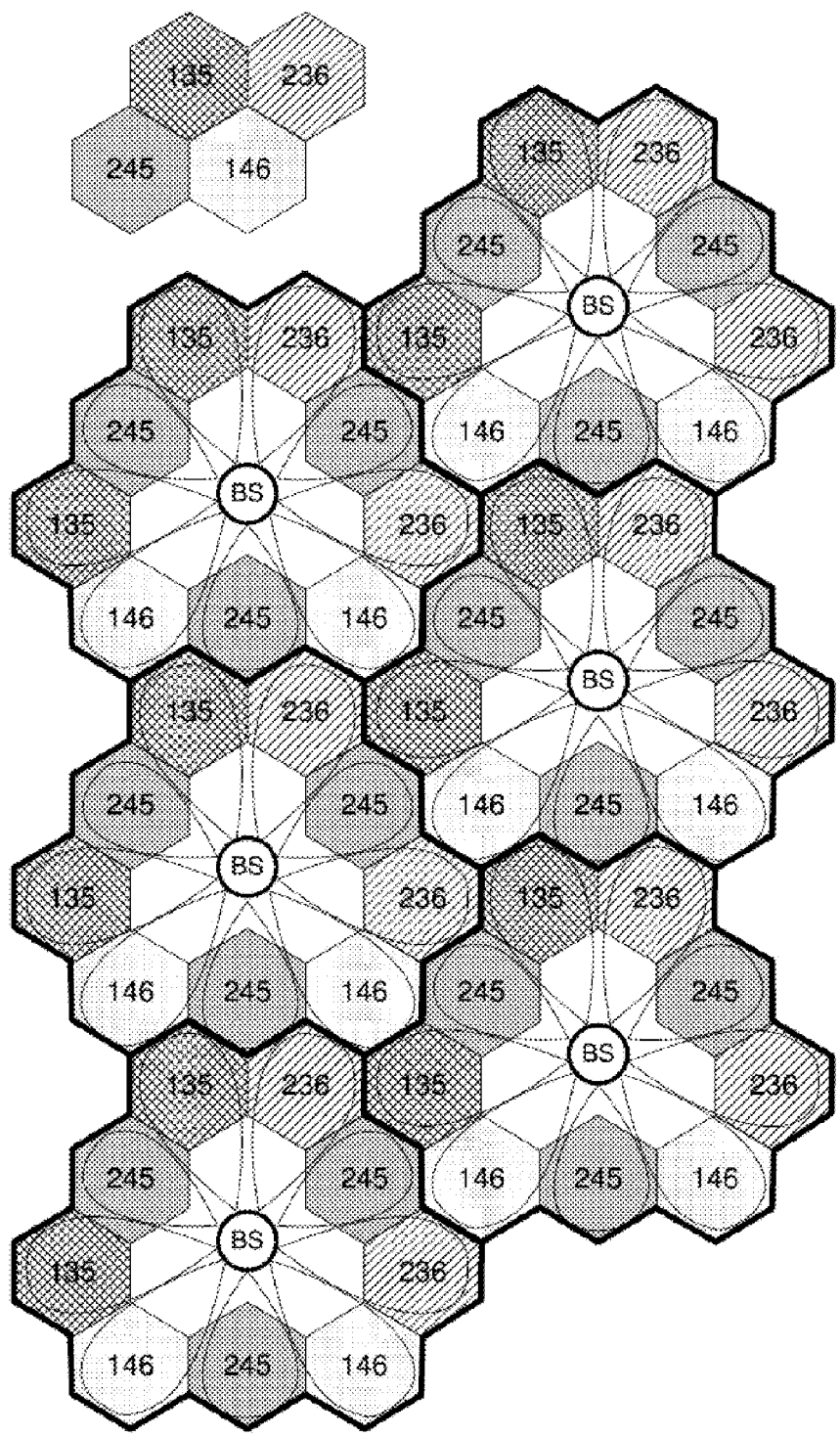
Figure 9 - Fractional Frequency Reuse
3 out of 6 resources in each sector
Based on 1-2-1-2-1-2 coloring in three directions
Applied to 9-sector deployment

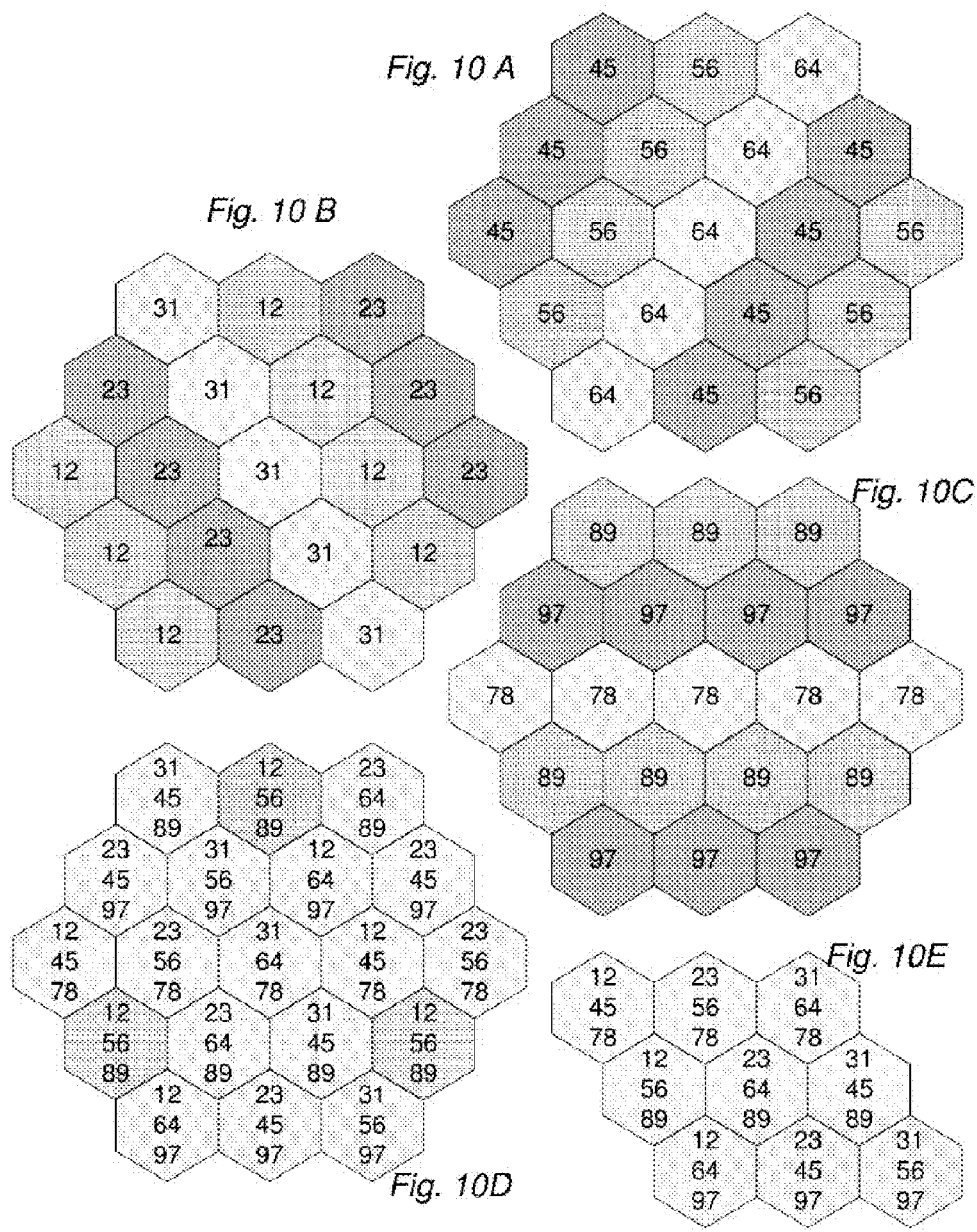
Figure 10 - Fractional Frequency Reuse
6 out of 9 resources in each cell construction
Based on (ab)-(bc)-(ca) coloring in three directions
results in 3*3 reuse block

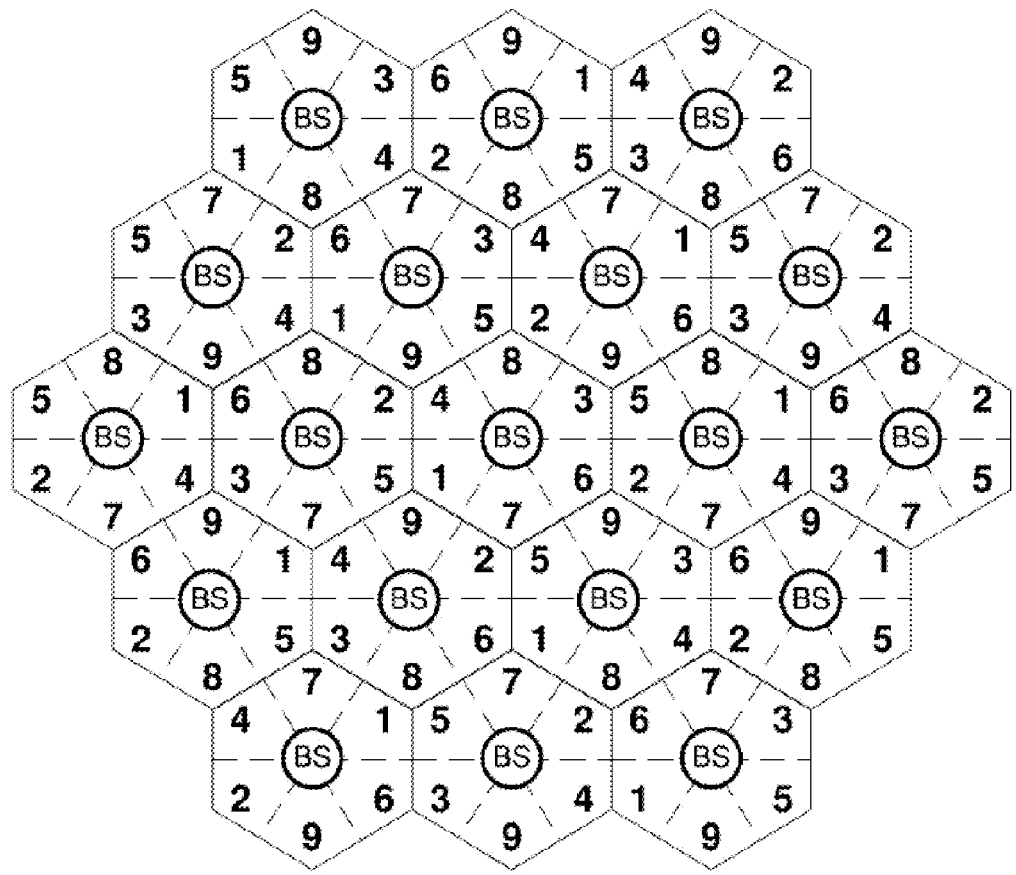
Figure 11 - FFR with 6 out of 9 resources in each cell-
prefered resource depending on location
within the cell

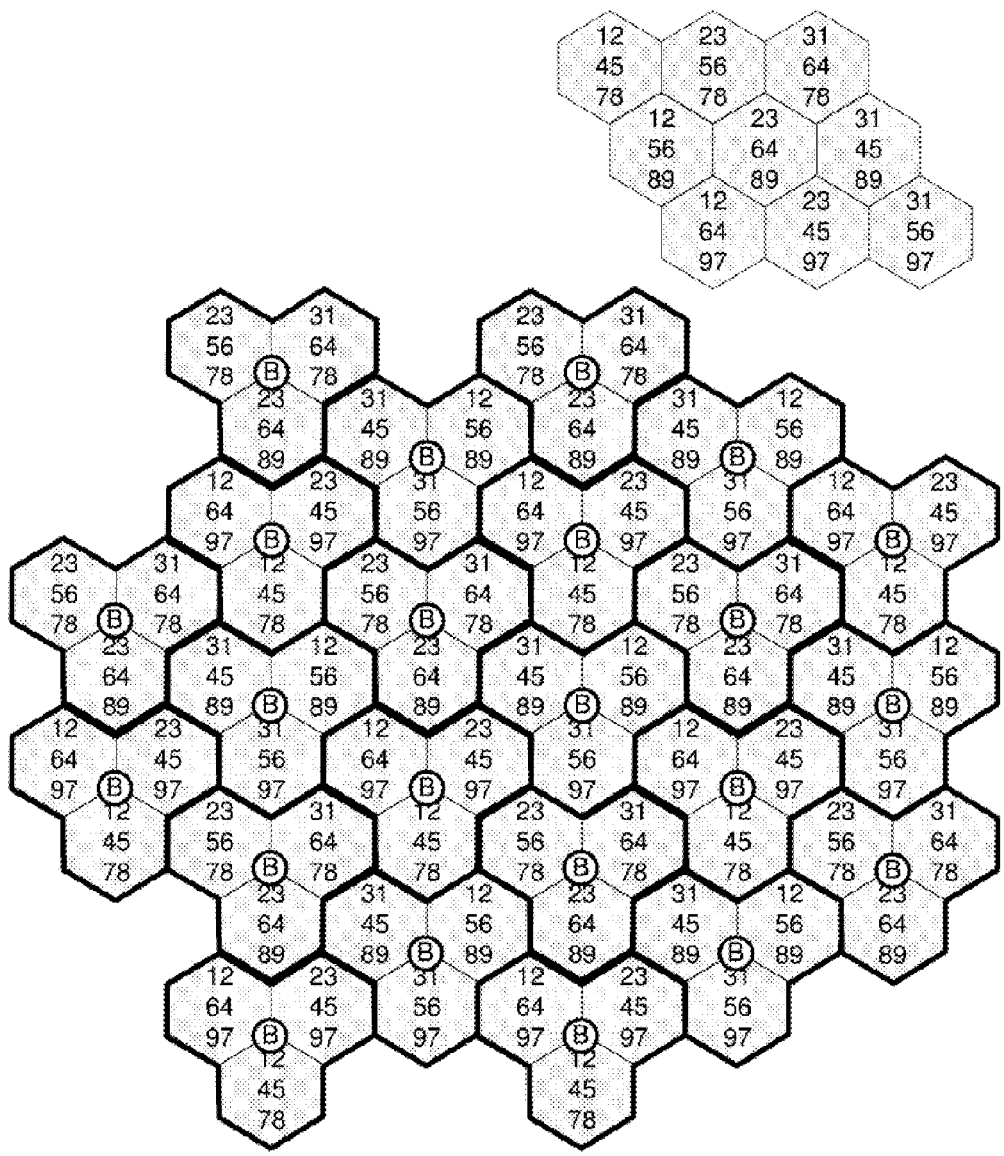
*Figure 12 - Fractional Frequency Reuse
6 out of 9 resources in each sector
Based on (12)-(23)-(31)-(12)-(23)-(31) coloring
in three directions
Applied to 3-sector clover-leaf deployment*

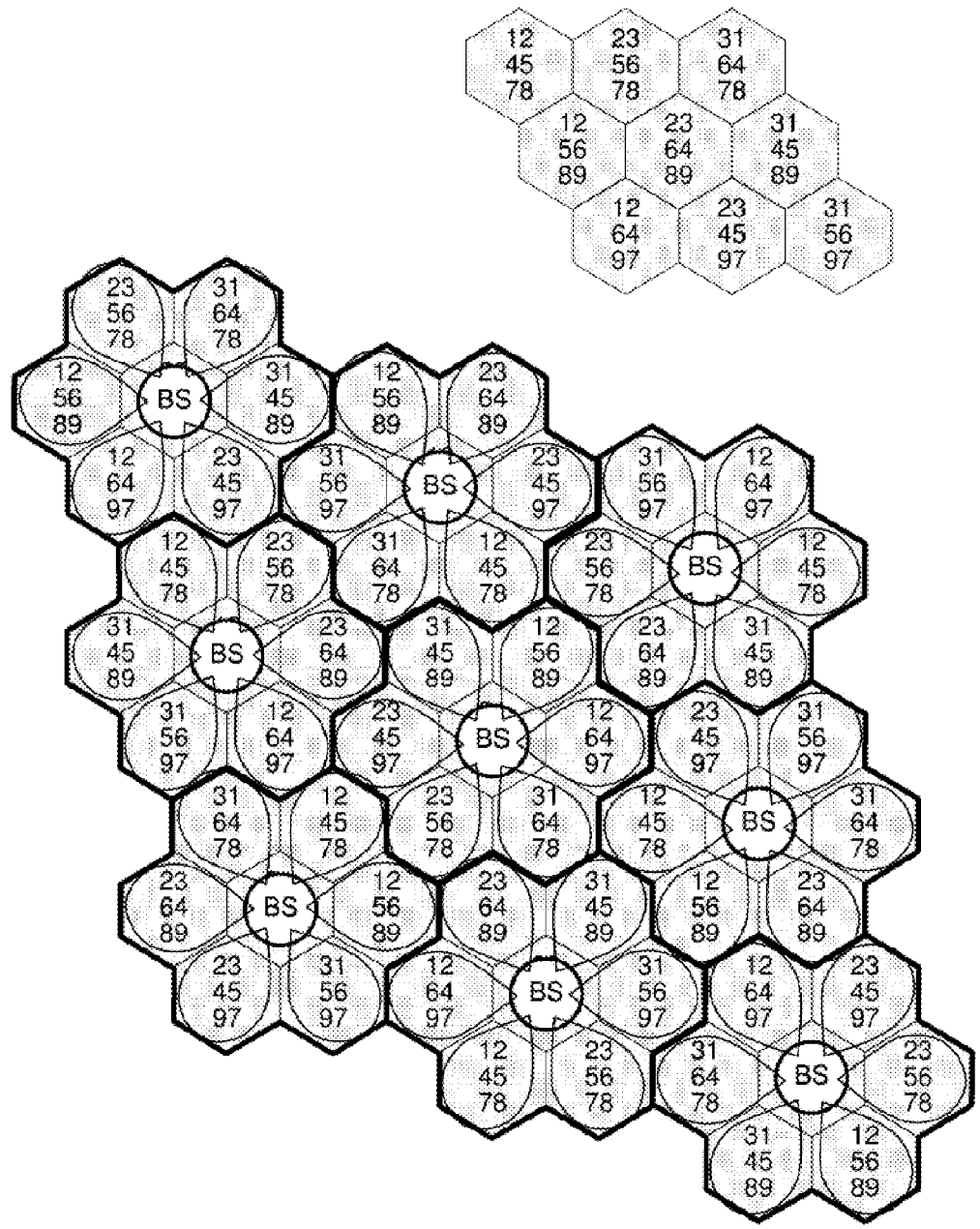
Figure 13 - Fractional Frequency Reuse
6 out of 9 resources in each sector
Based on (12)-(23)-(31)-(12)-(23)-(31) coloring
in three directions
Applied to 6-sector deployment

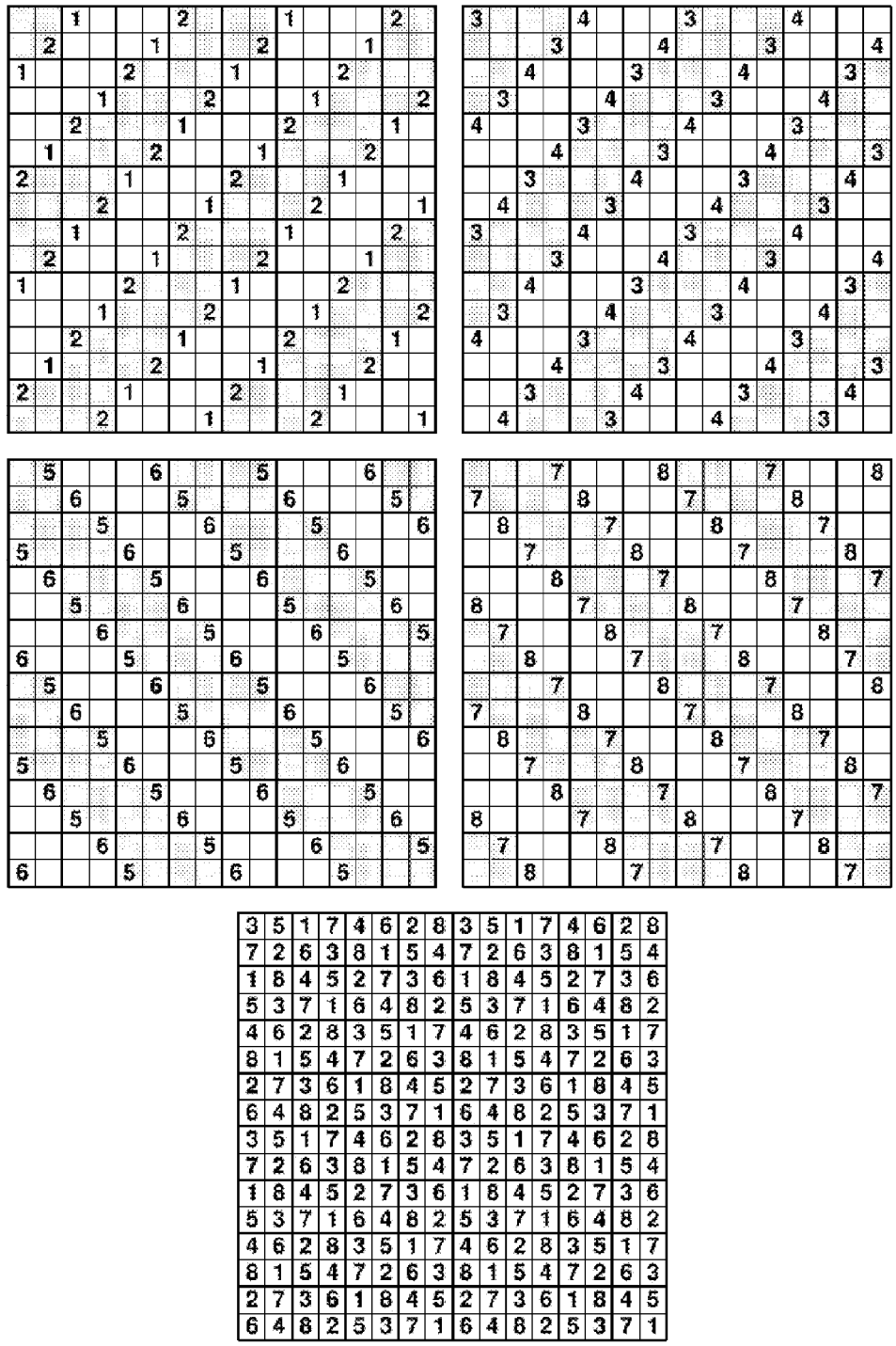
Figure 14 - Diagonal FFR design for square grid
4 out of 8 resources in each cell Figure 15 - Diagonal FFR design for square grid
4 out of 8 resources in each cell
Application to 4-sector deployment

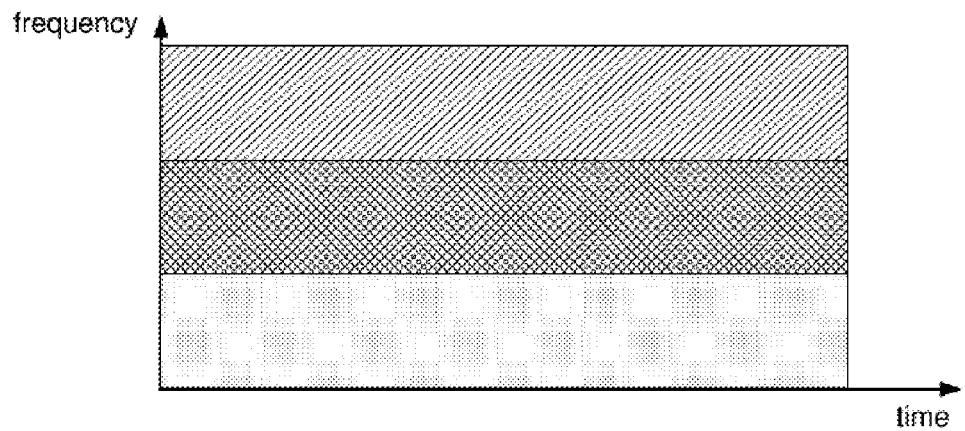
Figure 16A - resource division by frequency channels
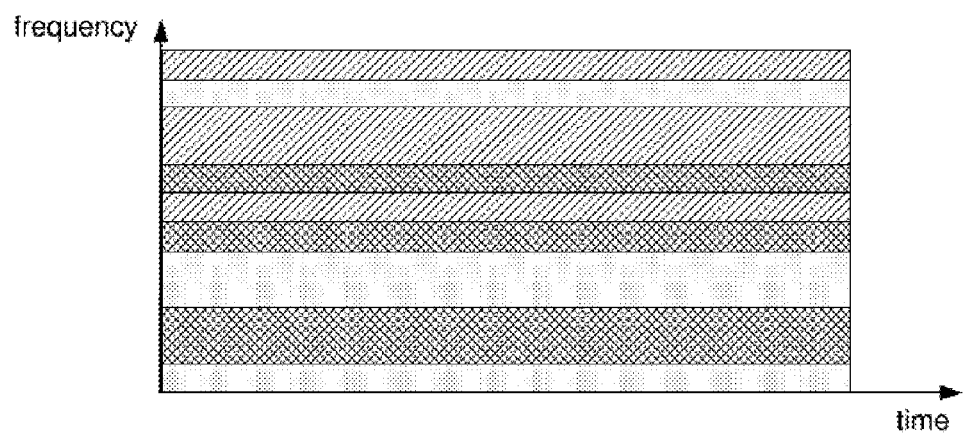
Figure 16B - resource division by subchannels
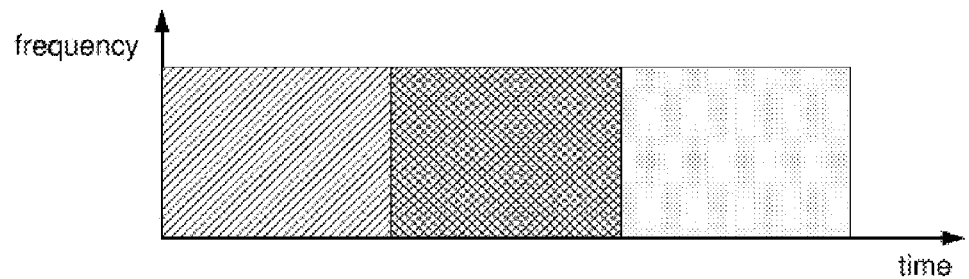
Figure 16C - resource division by time slots

FRACTIONAL FREQUENCY REUSE DEPLOYMENT METHOD FOR WIRELESS SYSTEM

FIELD OF THE INVENTION

The present invention relates generally to wireless communications systems and methods of using them, and in particular, to methods for implementing a high capacity reuse schemes using Fractional Frequency Reuse (FFR).

BACKGROUND OF THE INVENTION

A major issue facing the modern cellular systems is inter-cell interference which is caused by neighboring cells transmitting at the same time and frequency slots. This eventually leads to severe performance degradation and might even cause connection loss. The resource assignment issue is relevant to all modulation technologies, from the channel assignment in first analog systems to the subchannel assignment in the most recent Orthogonal Frequency Division Multiple Access (OFDMA) which became the underlying transmission technology for 802.16e (WiMAX) and Long Term Evolution (LTE).

There are several approaches to reduce the influence of inter-cell interference. The most common approach is to employ a frequency reuse pattern and by that, avoiding usage of the same frequency bands at adjacent cells. Still, the drawback of this approach is that only a fraction of the frequency resources may be used in each cell, while preferably one would like to reuse the whole available frequency spectrum within every cell.

In CDMA systems the "reuse 1" approach has been adopted. In these systems, the same resources are used in all cells. As a result, the C/I (carrier-to-interference) ratios at cell edges reach low values, in the order of –5 dB. These low C/I values are treated in CDMA systems by a combination of partial loading (fraction of the spreading codes used) and of soft handoff (use of same resource in more than one cell).

Another approach to improve the spectral efficiency in cellular systems is the "reuse partitioning" approach, as described, for example, in S. W. Halpern, "Reuse partitioning in cellular systems," 33rd IEEE VTC, pp. 322-327, May 1983. Further review can be found in I. Katzela and M. Naghshineh, "Channel assignment schemes for cellular mobile telecommunication systems: A comprehensive survey," IEEE Personal Communications, vol. 3, pp. 10-31, June 1996. The "reuse partitioning" method divides the frequency resource into two parts or more. First part is used for edge of cell regions, while second part is used for the regions closer to the base station. The first part is used with a conventionally designed reuse factor, appropriate for the cell edges. The second part (covering the inner part of the cell), however, can be used with a higher reuse factor because the Signal to Interference and Noise Ratio (SINR) is higher in this part of the cell in view of stronger desired signal and larger distance from the interferers. An example of such approach, for example is to divide the available channels into 4 channels, three of which are used in a reuse-3 pattern for covering the cell edge regions, while the fourth channel is used in a reuse-1 manner for the inner regions of the cells.

A better understanding of Fractional Frequency Reuse (FFR) is required in order to fully comprehend the various aspects of present invention. Frequency reuse 1 is achieved when all the cells within a network are operative at the same frequency channel. However, frequency reuse 1 in a cellular network implies that users at the cell edge (which constitutes a significant fraction of cell's area) may suffer from substantial inter-cell interference due to transmissions from adjacent cells. For example, if a subscriber is located at the same distance from base stations A, B and C, and the subscriber listens to base station A, the signal of base stations B and C would be regarded as unwanted interference. Thus, from the point of view of the subscriber, it is desirable that the resource (such as frequency channel) over which the subscriber listens to base station A will not be used in base stations B and C. One solution for the inter-cell interference is using reuse-N patterns in which one resource is used in each cell/sector and the resource is reused every N (e.g. 3) cells. Examples of frequency reuse 3 are shown in FIGS. 1A and 1B. On one hand, frequency reuse 3 systems achieve acceptable interference conditions at the cell border, but on the other hand the resource utilization in only third of its full potential.

The "reuse partitioning" approach is exemplified in FIG. 2A. Resources 1, 2 and 3 are used at the cell edges in a reuse-3 pattern, while resource 4 is used in a reuse-1 pattern at the inner part of the cell. In this example, two out of four resources are used in each cell.

Another method to improve upon the regular reuse-3 deployment is by implementing power-based Fractional Frequency Reuse (FFR), where users at the cell center are allowed to operate at all available resources but at lower power, while users located at the cell edge are allowed to operate only at a fraction of the resources available at the cell. A cell center is defined as the area closer to the respective base station that is practically immune to inter-cell interference. An illustration of this option is shown in FIG. 2B. This fractional resources' utilization enables subscribers located at adjacent cells' edges to operate while using different resources, thereby diminishing the inter-cell interference. An example of this option is a mix of reuse-3 for serving edge-of-cell users, where the expected inter-cell interference is strong, and reuse-1 for serving the users located at the inner part of the cell. Fractional frequency reuse schemes provide more uniform distribution of C/I over the cell and provide higher aggregate throughput.

The description of reuse schemes above is focused on omnidirectional cells, each having a base station installed at its center. The above considerations, however, apply also to sectored base stations. The most common arrangement in cellular industry is using 3-sector base stations. Sectors of a base station are sometimes referred to in the literature as "edge-illuminated cells". In this case, the interference between adjacent sectors is controlled by the patterns of the antennas used to illuminate the sectors.

In the Applicant's co-pending US application published under No. 20100075687, the transmission resources are allocated for conveying communications via each of a plurality of beam generating means so that the transmission resources allocated to each of the beam generating means is different from the transmission resources allocated for conveying communications via any of angularly adjacent beam generating means at the respective base station, and are different from the transmission resources allocated for conveying communications via beam generating means associated with adjacent base stations and directed towards geographical areas located in a proximity to the geographical area towards which the respective narrow beam is directed.

Still, it is required to implement a reuse scheme in which larger fraction of the resources can be used at the edge of the cell—½ or ⅔, as opposed to ⅓ in the typical FFR scheme, thereby enhancing the cell throughput.

SUMMARY OF THE INVENTION

It is an object of the present invention to provide a reuse scheme in which the resources that can be used at the edge of the cell are of reuse ½ or higher.

It is another object of the present invention to provide a novel method to allow increasing the capacity of a wireless system comprising an omni-directional or sectorized base station, by designing an FFR pattern capable of using large fraction of the resources at the cell edge.

Other objects of the present invention will be described as the description of the invention proceeds.

According to a preferred embodiment of the invention, there is provided a wireless communications system comprising a plurality of base stations and a plurality of subscriber devices, wherein each of the plurality of base stations comprises at least one antenna for communicating with respective subscriber devices currently located within a geographical area of a wireless cell served by a respective base station, and wherein:

the geographical area of the wireless cell comprises a geographical central area and a geographical edge area;

more than a third of all transmission resources available to the serving base station are available (preferably in aggregate) for communicating with subscriber devices located within the geographical edge area of the wireless cell; and at least one of the transmission resources available for communicating with each of the subscriber devices currently located within the geographical edge area of the wireless cell is other than any of the transmission resources available for communicating with subscriber devices currently located within geographical edge areas of wireless cells each having a geographical edge area that is geographically adjacent to the geographical edge area of the wireless cell at which the subscriber device is currently located.

As will be appreciated by those skilled in the art, the term "base station" as used herein throughout the specification and claims should be understood to encompass base stations and/or sectors of base stations. In addition, although the present invention is described herein as being associated with an omni-directional antenna, still, the description also applies, mutatis mutandis, to cases of sectorized deployment by treating the hexagonal grid as an array of edge-illuminated sectors rather than an array of omnidirectional cells.

According to a preferred embodiment of the invention the at least one transmission resource is a member of the group consisting of:

a) a frequency channel,
b) a set of frequency channels,
c) a set of frequency subchannels,
d) a time slot,
e) a set of time slots, and
f) any time-frequency slot combination.

According to another aspect of the invention there is provided a method for allocating transmission resources in a wireless communications network comprising at least one base station comprising at least one omni-directional antenna and a plurality of subscriber terminals, wherein the method comprises the steps of:

(a) providing a plurality of wireless cells comprised in the area covered by the wireless communications network;

(b) defining for each of the plurality of wireless cells a geographical central area and a geographical edge area; and (c) assigning a plurality of transmission resources to each of the wireless cells, wherein more than third of all transmission resources available at each of the plurality of wireless cells, are available for communicating with the subscriber devices currently located within the geographical edge area of the wireless cell; and wherein at least one of the transmission resources available for communicating with each of the subscriber devices currently located within the geographical edge area of at least one of the plurality of wireless cells, is other than any of the transmission resources available for communicating with subscriber devices located within geographical edge areas of wireless cells each having a geographical edge area that is geographically adjacent to the geographical edge area of the wireless cell at which the subscriber device is located.

According to an embodiment of the invention, all transmission resources available at each of plurality of wireless cells are available for communicating with each of the subscriber devices currently located within the geographical central area of the wireless cell.

In accordance with another embodiment of the invention, the area covered by the wireless communications system comprises a plurality of wireless cells each having a substantially hexagonal shape. In the alternative, the area covered by the wireless communications system comprises a plurality of wireless cells each having a substantially rectangular shape.

According to another embodiment of the present invention, in a case where a subscriber device is about to move from its current wireless cell to a new wireless cell, the currently serving base station informs either the subscriber device or a base station serving the new wireless cell or both, of at least one transmission resource available for conducting a handover procedure to the base station serving the new wireless cell, and wherein the at least one transmission resource may be used at the edge of the new wireless cell but is not currently used at the edge of the current wireless at which the subscriber device is currently located.

By still another embodiment of the present invention, at least one of the plurality of base stations is a sector of a base station and the antennas is a sectorial antenna.

BRIEF DESCRIPTION OF THE DRAWINGS

For a more complete understanding of the present invention, reference is made to the following detailed description taken in conjunction with the accompanying drawings wherein:

FIGS. 1A and 1B illustrate prior art configurations of cellular reuse planning, wherein FIG. 1A—illustrates an array of hexagonal cells having omni-directional base stations and resources that are assigned according to reuse-3 scheme;

FIG. 1B—illustrates a 3-sector base station having sector orientation forming clover-leaf cell shape and assigning resources according to reuse-3 scheme;

FIG. 2A—illustrates an embodiment of the "reuse partitioning" approach with reuse-3 that is used for edge-of-cell while reuse-1 is used for the center of the cell;

FIG. 2B—illustrates a power-based FFR scheme, in which reuse-3 is used for the edge-of-cell and all remaining resources are used at center of the cell at low power;

FIG. 3A—illustrates a prior art one dimensional resource allocation with a two resources cell;

FIG. 3B—illustrates a one dimensional FFR based resource allocation with three resources, where two resources are used by each base station;

FIG. 4A—illustrates a prior art solution for allocating three resources in a 3-sector base station;

FIG. 4B—presents an FFR based resources allocation in a 3-sector base station with three resources, of which two are being used in each sector;

FIG. 5—illustrate a FFR deployment with 3 out of 6 resources available at each cell, and a hexagonal cell configuration, wherein:

FIG. 5A—illustrates two resources allocated along parallel lines, one resource per line;

FIG. 5B—illustrates two resources allocated along diagonal lines, one resource per line;

FIG. 5C—illustrates two resources allocated along diagonal lines, one resource per line;

FIG. 5D—presents the result of the 3 out of 6 resources allocation;

FIG. 5E—presents a 2×2 block that constitutes a fundamental element in this deployment;

FIG. 6—demonstrates FFR deployment with 3 out of 6 resources available at each cell, wherein the preferred resource to be used depends upon the location within the cell;

FIG. 7—demonstrates FFR deployment with 3 out of 6 resources available at each sector, based upon 1-2-1-2-1-2 coloring in three directions, and applied at a 3-sector clover leaf deployment;

FIG. 8—demonstrates FFR deployment with 3 out of 6 resources available at each sector, based upon 1-2-1-2-1-2 coloring in three directions, and applied at a 6-sector deployment;

FIG. 9—demonstrates FFR deployment with 3 out of 6 resources available at each sector, based upon 1-2-1-2-1-2 coloring in three directions, and applied at a 9-sector leaf deployment;

FIG. 10—illustrate FFR deployment with 6 out of 9 resources available at each cell and a hexagonal cell configuration, wherein:

FIG. 10A—illustrates four resources allocated along parallel lines, two resource per line;

FIG. 10B—illustrates four resources allocated along diagonal lines, two resources per line;

FIG. 10C—illustrates another example of four resources allocated along diagonal lines, two resources per line;

FIG. 10D—illustrates the resulting configuration of allocating 6 out of 9 resources available;

FIG. 10E—presents a 3×3 block that constitutes a fundamental element in this deployment;

FIG. 11—demonstrates FFR deployment with 6 out of 9 resources available at each cell where the preferred resource depends on location within the cell;

FIG. 12—demonstrates FFR deployment with 6 out of 9 resources available at each sector based on (12)-(23)-(31)-(12)-(23)-(31) coloring in three dimensions, and applied in a 3-sectors' clover-leaf deployment;

FIG. 13—demonstrates FFR deployment with 6 out of 9 resources available at each sector based on (12)-(23)-(31)-(12)-(23)-(31) coloring in three dimensions, and applied in a 6-sectors' deployment;

FIG. 14—illustrates diagonal FFR designs for square grids, where 4 out of 8 resources are available in each cell;

FIG. 15—presents diagonal FFR designs for square grids, where 4 out of 8 resources are available in each cell, and applied in a 4-sector deployment;

FIG. 16—illustrate different ways of partitioning the time-frequency pool of resources into resources which are assigned to the antenna beams, wherein:

FIG. 16A—demonstrates designating frequency channels as the resources;

FIG. 16B—demonstrates designating frequency sub-channels, composed of possibly noncontiguous frequency sub-bands, as the resources; and FIG. 16C—demonstrates partitioning time frame into time slots and designating the time slots as the resources.

DETAILED DESCRIPTION OF THE INVENTION

The principles and operation of the method and system that are in conformity with the present invention may be better understood with reference to the accompanying drawings and the following description that illustrate some specific non-limiting examples of preferred embodiments for carrying out the present invention. For easier understanding of the drawings, the transmission resource referred to is a transmission frequency, and wherever a cell is illustrated with certain optional frequencies they typically refer to the frequencies that may be assigned to subscriber devices located at the edge of that cell, whereas the frequency for use by a subscriber device located at the central part of the cell, is selected from among all frequencies that are available at that cell.

One-Dimensional Deployment

The major principle draws upon a fact that users within a cell are subjected to different geometries with respect to dominant interferers, and when several resources are used, the preferred resource for a given user may depend on his location within a cell. Let us first exemplify the principle on a one-dimensional example. Assume a line of equidistant base stations along a road. A prior art cellular design would use distinct resources in each base station in A-B-A-B etc. pattern, as exemplified in FIG. 3A. By this way, the cells adjacent to the user's cell both use a resource different from the one used in the user's cell. As a result, the closest interferer is located two cells away, and a user at the edge of a cell has C/I arising from the distance ratio of 0.5*D (to the desired base station) and 1.5*D (to the nearest interfering base station). Let us now assign resources to the base stations along the road in a different way—AB-BC-CA etc., as shown in FIG. 3B, where AB means that both resources A and B are used throughout the cell. Let us look now at a user at the right part of the BC cell. The cell next to it uses the resources CA, meaning that the resource C is interfered substantially. However, resource B is not interfered by the right base station; it is interfered by the left base station which uses resources AB, or the next adjacent cell on the right which also uses AB. At the edge of the cell the distance ratio between the desired base station, 0.5*D, and the nearest undesired station, 1.5*D is same as we previously had with A-B-A-B resource assignment. Let us look now at an edge user located to the left of a base station. This user has the resource B interfered by the nearest base station which uses AB, however resource C has lower interference due to the larger distance to the nearest base stations using this resource. Therefore, the population of users within the BC cell will split into two—the edge users to the right of the base station which will use resource B, while the edge users to the left of the base station which will use resource C. It should be noted that the users that are located close to the base station may use either one of the two resources, because the desired signal is strong relative to the interference. The carrier-to-interference ratio (C/I) at the edge of the cell in the case with AB-BC-CA- assignment is similar to the C/I in the A-B- assignment in spite of the fact that the utilization of the resources in each cell was improved from ½ to ⅔.

Another example application of the principle is an isolated multi-sector cell, shown in FIG. 4. The gain-vs.-azimuth pattern of the antennas used in the sector causes users located at an angular boundary between two sectors to listen to the base stations operating in those two sectors at the same power and to listen to all other sectors at a reduced power. In the case of three sectors, the prior art way is to use 3 resources A, B, C in the three sectors to assure that no two adjacent sectors use the same resource at the edge of the cell, as illustrated in FIG. 4A.

By using the principle of the present invention, however, we can use the groups of resources AB, BC and CA in the three sectors, as illustrated in FIG. 4B. In this case the users at the center of each sector may use either one of both available resources, and the population of the edges users in each sector will split in half, at the right edge (clockwise) part of the cell using one resource and at the left edge (counterclockwise) part using the other resource, depending on which resource is not used in the nearest adjacent sector. In this case we improve the resource utilization from ⅓ to ⅔. In a case of even number of sectors such as six (in this particular example we need the number of sectors to be divisible by three), we could start with resource allocation A-B-A-B-A-B (use of ½ of the resources in each sector) and improve it to AB-BC-CA-AB-BC-CA (use or ⅔ of the resources in each sector).

Two-Dimensional Deployment

According to a preferred embodiment of this invention, the method is applied to two-dimensional cellular deployments. The principle discussed above was straightforward to apply with cells situated along one dimension (distance or angle, as was demonstrated in the FIGS. 3 and 4). In the case of two dimensional cell array, such as hexagonal array typically used in cellular networks, each cell has multiple neighboring cells (six for a hexagonal array), and the design of resource assignment to cells while obeying to the design rule that for a user located near the cell boundary there is always a resource not used in adjacent cells, becomes a rather complicated task. It is an object of this invention to devise a resource assignment method for a two dimensional array of cells satisfying the FFR principle. Another object of this invention is to apply the method above to base stations with multiple sectors.

The underlying principle of the present invention is to superimpose the one-dimensional FFR assignment method as applied to the three directions of the hexagonal grid. FIG. 5A illustrates a quasi-one-dimensional resource assignment and the areas in which it strives to achieve adequate C/I. There are two angular segments we are looking at, and the users located in the two might possibly use different resources. FIGS. 5B and 5C illustrate the quasi-one-dimensional resource assignment in the other two dimensions and the respective areas targeted. FIG. 5D shows now the composition of the three assignments showing that for each of the six segments composing a cell there is a resource arising from FFR resource assignment in one of the three directions, in which the C/I is adequate. FIG. 5E presents the 2×2 block which constitutes the basic unit for deployment in the network. FIGS. 6-9 provide different examples for implementing the 2×2 block as described in FIG. 5E. FIG. 6 demonstrates the deployment in omni-directional base stations, FIG. 7 demonstrates the deployment in a 3-sector clover-leaf, FIG. 8 demonstrates the deployment in a 6-sector scheme, and FIG. 9 demonstrates the deployment in a 9-sector scheme.

The same procedure for implementing the one-dimensional FFR assignment to three underlying directions of hexagonal grid is demonstrated in FIG. 10 for 6 out of 9 resources at each cell deployment having a hexagonal cell configuration. As before, there are two angular segments we are looking at, and the users located in the two angular segments might possibly use different resources. FIGS. 10A, 10B and 10C illustrate the quasi-two-dimensional resource assignment in three dimensions and the respective areas targeted. FIG. 10D shows now the composition of the three assignments illustrating that for each of the nine segments composing a cell there is a resource arising from FFR resource assignment in one of the three directions, in which the C/I is adequate. FIG. 10E presents the 3×3 block which constitutes the basic unit for deployment in the network. FIGS. 11-13 provide different examples for implementing the 3×3 block as described in FIG. 10E. FIG. 11 demonstrates the deployment in omni-directional base stations, FIG. 12 demonstrates the deployment in a 3-sector clover-leaf and FIG. 13 demonstrates the deployment in a 6-sector scheme.

The general idea of dividing the cells into areas which differ in terms of dominant neighbors applies to other scenarios as well. The example illustrated in FIG. 14 shows a square grid of cells (such as street corners), in which each cell uses 4 resources out of available 8. In each corner, none of the three cells adjacent to that corner use the same resource as used by the corner user. This comes in contrast with "checkerboard" coloring with two resources, in which edge users experience "C/I=0 dB" interference from the opposing cell. In both cases—4-out-of-8 FFR and checkerboard—half of the resources is used in each cell, but the FFR users experience higher C/I, thereby achieving higher spectral efficiency. The same deployment can be applicable to a square grid with 4 sectors per base station as demonstrated in FIG. 15.

Duplexing

The description above focused primarily on the interference occurring between resources for downlink transmissions. Similar considerations, mutatis mutandis, are applicable for uplink transmissions in duplex communications, so that the cellular planning method of the present invention applies for downlink, uplink and bidirectional communications. Moreover, the same considerations equally apply to Frequency Division Duplex as well as to Time Division Duplex bidirectional communications.

Communication Resources

The resources usually discussed in cellular communications are frequency channels. However, the division of the time-frequency plane into non-overlapping resources can happen in various ways, as shown in FIG. 16. FIG. 16A shows the regular way of defining frequency channels as resources. FIG. 16B shows an alternate way of dividing the frequency resource in noncontiguous way. This way of partitioning frequency into resources is useful, for example, in OFDMA systems such as those described by the IEEE 802.16 Recommendation (also known as WiMAX), in which subcarriers of OFDMA are divided into sub-channels and groups of sub-channels can be assigned, for example, to sectors as resources. Third way of dividing the resources in time domain is illustrated in FIG. 16C. The time is divided into slices, and groups of time slices are designates as a resource. For example, in a frame based communication system each third frame can be assigned to a sector as a resource. Alternately, each frame can be partitioned into sub-frames and a given sub-frame within each frame can be assigned as a resource. The frequency and/or timeslot assignments as resources can be static or can be time-varying, such as with frequency hopping. Additional domains of division into resources can be used, such as codes within a CDMA system or polarization.

Application to Given Base Station Locations

The design procedure for controlling interference among sectors in multisector base stations was exemplified above in a synthetic case where the system operator has the freedom to locate the base stations on a hexagonal grid. In real life the base station locations are usually offset from such ideal grid due to real-life restrictions. The underlying principle for not using certain resources along line-like stretches of cells in order to create an extended border area in which two nearest cells both do not use that given resource, is applicable to general deployments as well as to the regular case. The non-use of a resource along a stretch of base stations (sectors) for different resources and along different directions of the line stretches is repeated until most of the cell borders have a resource which is not used by the two dominant adjacent interfering cells. Preferably, the procedure is repeated in a manner which renders a significant fraction of resources usable within each cell.

Performance of a System Constructed According to the Present Invention

The performance of cellular communication systems, constructed in accordance with the above described examples, was analyzed using a MATLAB package constructed for that purpose. The simulation takes into account antenna shapes, distances and propagation laws to evaluate the carrier-to-interference for each location within a deployment area. The C/I is then translated into a modulation level supported by each user (many modern communication systems, such as those that are compatible with the IEEE 802.16 Recommendation, support modulations varying over wide range from BPSK to 64QAM). For simplicity, Shannon-capacity-type equation was used to convert C/I to data rate. The throughput is then averaged over the deployment area. The average throughput depends on the fairness criterion—whether each user gets the same data rate or whether each user gets the same fraction of airtime. Generally, the equal-data scheduling policy results in lower throughput than equal-time policy.

Exemplary simulation results are shown in tables 1 and 2 for onmidirectional cells and for 3-sector cells, respectively. The spectral efficiency is normalized with respect to the overall bandwidth used by the deployment and the cases demonstrated in these Tables are of using 1 out of 3 resources (conventional reuse-3), 3 out of 6 resources (FFR according to present invention), 6 out of 9 resources (FFR according to present invention), and reuse-1. The results indicate that the 6-out-of-9 FFR scheme outperforms both the reuse-1 case, especially in equal-rate regime, and the reuse-3 case.

TABLE 1

Cell throughput with omni cells (b/sec/Hz)

| Number of resources | Cell throughput (equal time) | Cell throughput (equal rate) | C/I min |
|---|---|---|---|
| 1 out of 3 | 1.03 | 0.76 | +5 dB |
| 3 out of 6 | 1.08 | 0.71 | +2.5 dB |
| 6 out of 9 | 1.23 | 0.79 | +1 dB |
| Reuse-1 | 1.21 | 0.51 | −5 dB |

TABLE 2

Sector throughput with 3 sector cells (b/sec/Hz)

| Number of resources | Cell throughput (equal time) | Cell throughput (equal rate) | C/I min |
|---|---|---|---|
| 1 out of 3 | 0.82 | 0.56 | +4 dB |
| 3 out of 6 | 0.97 | 0.60 | +2 dB |
| 6 out of 9 | 1.03 | 0.60 | +0.5 dB |
| Reuse-1 | 0.85 | 0.37 | −5 dB |

As will be appreciated by those skilled in the art, additional domains of partitioning the resources that are known in the art per se, such as polarization or CDMA spreading codes, should be understood as being encompassed by the present invention. Also, it should be noted that the examples provided herein show the use of the method and system proposed by the present invention. However, similar processes may be applied in a similar way for determining the configuration of the network in order to increase the capacity of the base stations included in that network, all without departing from the scope of the present invention.

The invention claimed is:

1. A wireless communications system comprising:
a plurality of base stations including a serving base station; and
a plurality of subscriber devices, wherein
each of the plurality of said base stations comprises at least one antenna for communicating with respective subscriber devices currently located within a geographical area of a wireless cell served by a respective base station;
the serving base station having more than a third of all transmission resources available to it allocated for communicating with the subscriber devices located within a geographical edge area of the wireless cell; and
the serving base station having at least one of the transmission resources available for communicating with the subscriber devices currently located within said geographical edge area of the wireless cell being common with any of the transmission resources allocated for communicating with subscriber devices located within geographical edge areas of an adjacent wireless cell;
whereby the common transmission resource used in the adjacent cell is selected to minimize interference at the edge of all wireless cells adjacent with the wireless cell of the serving base station; and
wherein when one of the subscriber devices is about to move from the wireless cell to an adjacent wireless cell, the serving base station informs another base station serving said adjacent wireless cell or said another base station and the wireless device of at least one particular transmission resource to be used for conducting a handover procedure to a base station serving the adjacent wireless cell.

2. The wireless communications system according to claim 1, wherein the transmission resource includes:
a) a frequency channel,
b) a set of frequency channels,
c) a set of frequency subchannels,
d) a time slot,
e) a set of time slots, or
f) a plurality of time-frequency slot combinations.

3. The wireless communications system according to claim 1, wherein the area covered by said wireless communications system comprises a plurality of wireless cells each having a substantially hexagonal shape.

4. The wireless communications system according to claim 1, wherein the area covered by said wireless communications system comprises a plurality of wireless cells each having a substantially rectangular shape.

5. The wireless communications system according to claim 1, wherein said particular transmission resource is the transmission resource common to said wireless cell and said adjacent wireless cell.

6. The wireless communications system according to claim 1, wherein said particular transmission resource is different from any transmission resource allocated in the adjacent wireless cell.

7. The wireless communication system according to claim 1, wherein said particular transmission resource is not currently used by any other subscriber device at the edge of the first wireless cell.

8. The wireless communication system according to claim 1, wherein the wireless cell is hexagonally shaped.

9. The method according to claim 1, wherein the wireless cell is hexagonally shaped.

10. A method of fractional frequency reuse for deployment in a wireless communications system comprising a plurality of base stations and a plurality of subscriber devices, each of the plurality of said base stations comprises at least one antenna for communicating with respective subscriber devices currently located within a geographical area of a wireless cell served by a respective base station, the method comprising:

- allocating more than a third of all transmission resources available to said serving base station for communicating with the subscriber devices located within a geographical edge area of the wireless cell;
- selecting at least one of the transmission resources available for communicating with the subscriber devices currently located within said geographical edge area of the wireless cell which is common with any of the transmission resources allocated for communicating with subscriber devices located within geographical edge areas of an adjacent wireless cell;
- the common transmission resource used in the adjacent cell is selected to minimize interference at the edge of all wireless cells adjacent with the wireless cell of the serving base station; and
- when the subscriber device is about to move from the wireless cell to an adjacent wireless cell, the serving base station informs another base station serving said adjacent wireless cell or said another base station and the wireless device of at least one particular transmission resource to be used for conducting a handover procedure to a base station serving the adjacent wireless cell.

11. The method according to claim 10, wherein the transmission resource includes:
  a) a frequency channel,
  b) a set of frequency channels,
  c) a set of frequency subchannels,
  d) a time slot,
  e) a set of time slots, or
  f) a plurality of time-frequency slot combinations.

12. The method according to claim 10, wherein the area covered by said wireless communications system comprises a plurality of wireless cells each having a substantially hexagonal shape.

13. The method according to claim 10, wherein the area covered by said wireless communications system comprises a plurality of wireless cells each having a substantially rectangular shape.

14. The method according to claim 10, wherein said particular transmission resource is the transmission resource common to said wireless cell and said adjacent wireless cell.

15. The method according to claim 10, wherein said particular transmission resource is different from any transmission resource allocated in the adjacent wireless cell.

16. The method according to claim 10, wherein said particular transmission resource is not currently used by any other subscriber device at the edge of the first wireless cell.

* * * * *